Patented Nov. 27, 1934

1,982,595

UNITED STATES PATENT OFFICE 1,982,595

METHOD OF MAKING MARINE PLANT PRODUCT

Philip R. Park, Buffalo, N. Y., assignor to Philip R. Park, Inc., San Pedro, Calif.

No Drawing. Application February 27, 1932, Serial No. 595,658

3 Claims. (Cl. 99—5)

In the processing of marine plants for use as foods, various difficulties have been encountered due to the nature of these plant growths. This is particularly true of the kelps and seaweeds and while my invention is not limited to any particular family or species, these and particularly kelp afford such a characteristic illustration that I will particularly refer to it without intending to be limited by such discussion.

In my previous Patent No. 1,875,352, dated September 6, 1932, to which I make particular reference on account of the relation of my present inventions thereto, I discussed at some length the relation of the natural properties of marine plant life to both animal and human diet.

The natural properties of the marine plants are, of course, perfectly well known and understood and their use for food and for medicinal purposes known even to the ancients. The importance of these properties, particularly those of the constituents carrying iodine, has received very considerable recognition in the treatment of prevention of deficiency diseases. While less commonly known the effects of nickel, manganese, cobalt, copper, zinc, and many other metals for the functioning of glands and other organs, are recognized.

The difficulty generally in the utilization of such marine plant life is due to its structure which in its natural state may be generally described as rubbery and resistant and of course containing very large amounts of water. It was the ancient custom to dry out such plants for food purposes, but these plants in their natural state of growth are difficult of mastication and digestion and any ordinary drying out leaves the material in its original rubbery condition.

According to my concept and as pointed out in my previous application, this difficulty may be overcome by subjecting the material to a disruptive heating at a temperature sufficiently above the boiling point of the plant juices to disrupt, distend or open out the cell structure. By subjecting the material to a high temperature there is apparently a searing effect so that the exudable material of the plant, such as the juices and pulps, are not lost but rather are cooked in.

Furthermore, by heating at higher temperatures certain changes are effected in the colloids and like properties of the plants. This may be generally termed a depeptising which renders them more readily digestible and prevents the material from developing the gummy or rubbery characteristic before noted. This rubbery characteristic persists in ordinary dried kelp and the product becomes gelatinous in any mixture in which water is present.

According to my present concept I effect a still further modification of the material to the end of obtaining a more complete disruption of the cell structures and changing the characteristics of the plant properties as above described.

I have found that by reducing the kelp, stem, stalk and leaves, to a pulp, that I am able to effect a more perfect heat treatment and produce a product of uniformly high quality. In practice I take the kelp and reduce it to a comminuted form. This I then subject to a pulping operation. Preferably I accomplish this by a beater which reduces the kelp to a soft mass in which the fibres and cellular material are substantially uniformly distributed. This is preferably carried to a point where the stock is in the form of a thick sludge being pulpy but fluent.

This pulp I then dry as before described subjecting it at first to a high temperature well above the boiling point of the plant juices. I provide for a drying in which this higher temperature will diminish so that after the initial disruptive and searing heat treatment the material receives a diminishing heat until it is substantially dry.

In practice I utilize a rotary drier through which the pulp is fed. I have found that high temperatures such as those possible with natural gas combustion may be used. In fact, I utilize temperatures at the hotter end of my drier as high as 1600–1700° F., and this may be diminished gradually to any suitable temperatures, say 230–250° F. at the discharge end. Throughout the drying process the temperature is maintained above that of the boiling point of the plant juices. In such a processing the pulp first meets the very high temperatures of the hot gases, being agitated as by the rotation of the drier so that it is quickly heated to a high temperature at which my depeptising or disruptive cooking and searing effect takes place. This is then carried on usually for a period of about one-half hour in progression through the drier which is about sixty feet in length.

The size of the drier, its length, the speed of rotation and the rate of feed may be varied. The pulping may be effected by any apparatus, as by macerating, beating or other mechanical manipulation to reduce it to the condition described.

The temperatures of the initial cooking of the pulp may vary. It should, according to my theory, be well above the boiling point of the plant juices and according to my original practice I operated at an initial temperature of 800–900° F. As stated above, however, I have been able to utilize high temperatures with my pulp with increased success.

The product when dry or practically dry contains only a few percent of moisture. It may then be screened, powdered, ground, or otherwise treated according to the form desired. For food mixtures it may be mixed or blended with cereal bases either for animal food or for human consumption. In such mixtures there may be provided any desired proportioning of the ingredients or additional materials to obtain so-called rations or balanced foods. However, my product whether utilized simply as a pulped, disrupted and cooked kelp, or used in mixtures has all of the high efficiency of the kelp or other marine plant life used.

What I therefore claim and desire to secure by Letters Patent is:—

1. In the processing of marine plants to produce dry or commercially available food forms, those steps consisting in reducing the plant structure to a macerated pulp having a substantially uniform distribution of fibre and plant cell structure, in drying the pulp during agitation at high temperatures to produce disruptive cooking of the combined fibre and cell structure and to seal the salts within the particles thereof.

2. In the processing of marine plants to produce dry or commercially available food forms, those steps consisting in reducing the plant structures to a macerated pulp having a substantially uniform distribution of fibre and plant cell structure, and in quickly heating the pulp to a temperature sufficiently high above the boiling point of the plant juices to effect cooking of the pulp and sealing the pulp particles and to seal the salts within the particles thereof.

3. In the processing of marine plants to produce dry or commercially available food forms, those steps consisting in subjecting the plant structures to a disruptive pulping to effect a substantially uniform distribution of fibre and plant cell structures, effecting an agitated progression of the pulp through gases at high temperature to produce disruptive cooking of the combined fibre and cell structure and to seal the salts within the particles thereof.

PHILIP R. PARK.